(12) United States Patent
Nagaraj et al.

(10) Patent No.: US 9,247,497 B2
(45) Date of Patent: Jan. 26, 2016

(54) COMMUNICATING LATENCY-SENSITIVE DATA OVER A WIRELESS DATA LINK

(75) Inventors: Suresh Nagaraj, Sunnyvale, CA (US); Genevieve M. Peres, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 13/466,823

(22) Filed: May 8, 2012

(65) Prior Publication Data

US 2013/0301496 A1 Nov. 14, 2013

(51) Int. Cl.
*G08C 17/00* (2006.01)
*H04W 52/02* (2009.01)
*H04W 84/12* (2009.01)

(52) U.S. Cl.
CPC .......... *H04W 52/0216* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 8,254,394 B1* | 8/2012 | Gummalla | ............... | H04L 5/00 370/395.43 |
| 2003/0043761 A1* | 3/2003 | Hladik | ............... | H04B 7/212 370/319 |
| 2005/0070340 A1* | 3/2005 | Kim | ............... | H04W 52/0216 455/574 |
| 2007/0047657 A1* | 3/2007 | Toma | ............... | G10L 19/012 375/240.24 |
| 2008/0130542 A1* | 6/2008 | Tang | ............... | H04L 29/12839 370/311 |
| 2009/0323524 A1* | 12/2009 | Kuhn | ............... | H04L 43/0894 370/230 |
| 2010/0220641 A1* | 9/2010 | Son | ............... | H04W 52/0241 370/311 |
| 2010/0278043 A1* | 11/2010 | Abdel-Kader | ............... | H04L 65/80 370/233 |
| 2011/0038290 A1* | 2/2011 | Gong | ............... | H04W 52/0235 370/311 |
| 2013/0294261 A1* | 11/2013 | Ghosh | ............... | H04W 28/14 370/252 |

* cited by examiner

*Primary Examiner* — Kwang B Yao
*Assistant Examiner* — Hardikkumar Patel
(74) *Attorney, Agent, or Firm* — Sterne, Kessler, Goldstein & Fox P.L.L.C.

(57) ABSTRACT

A method and apparatus are described for communicating data frames over a wireless data link between an access point and a transceiver in an electronic device. In the described embodiments, a processing subsystem in the electronic device is configured to determine a frame interval based on a codec used to generate data contained in data frames. The transceiver is configured to use the frame interval as a timing reference for transitioning the transceiver between a constant awake mode and a power save mode so that during each of one or more frame intervals, the transceiver: transmits a data frame to the access point that indicates that the power save mode is disabled, enters the constant awake mode, receives one or more frames from the access point, transmits a frame to the access point that indicates that the power save mode is enabled, and enters the power save mode.

27 Claims, 6 Drawing Sheets

COMMUNICATING LATENCY-SENSITIVE DATA OVER A WIRELESS DATA LINK

BACKGROUND

1. Field

The described embodiments relate to communicating data over a wireless link. More specifically, the described embodiments relate to communicating latency-sensitive data over a wireless data link between an access point and an electronic device.

2. Related Art

Many modern electronic devices that communicate over a wireless data link with an access point (e.g., using a wireless network such as described in the Institute of Electrical and Electronics Engineers (IEEE) standards 802.11) may conserve energy by temporarily reducing the power consumption of the transceiver in the electronic device by putting it into a power save mode. When in the power save mode, the electronic device may then periodically return to a constant awake mode to send data and/or receive data cached at the access point.

The longer the transceiver stays in the power save mode, the more energy the electronic device can conserve. However, when the electronic device is transmitting and/or receiving latency-sensitive data such as voice or video data, long sleep periods may introduce delays in sending or receiving data that cause a noticeable lag and result in an undesirable user experience. In order to avoid introducing an unacceptable lag, an electronic device may prevent its transceiver from going into a power save mode when sending or receiving latency-sensitive data. However, maintaining the transceiver in a constant awake mode may result in increased energy usage by the electronic device, which for electronic devices powered by a battery, may result in a shorter battery life per charge.

Additionally, although the IEEE 802.11 standard has been amended (e.g., see IEEE 802.11e amendment) to include support for power management methods such as automatic power save delivery (APSD) that allow for the timely delivery of latency-sensitive data, these methods require overhead at the electronic device to set up and tear down, and they may not be supported by many legacy APs.

BRIEF DESCRIPTION OF THE FIGURES

In the figures, like reference numerals refer to the same figure elements.

DETAILED DESCRIPTION

Figure 1:
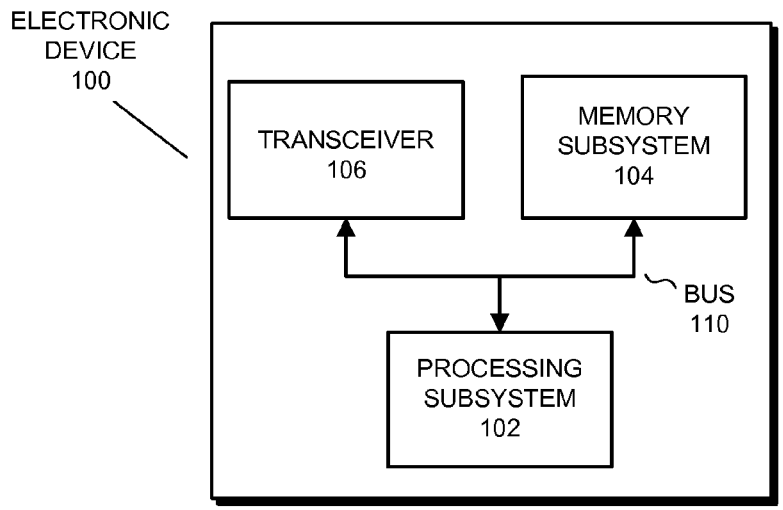
FIG. 1 presents a block diagram illustrating an electronic device in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that, in the described embodiments, the computer-readable storage medium does not include non-statutory computer-readable storage mediums such as transmission signals.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of embodiments.

Overview

The described embodiments perform operations for communicating frames (data frames, control frames, etc.) over a wireless data link between an electronic device and an access point (AP). In the described embodiments, the electronic device can include any electronic device with a transceiver that can communicate over a wireless data link with an AP An AP is generally a device that communicates frames with one or more electronic devices over a wireless data link. The wireless data link may conform to the Institute of Electrical and Electronics Engineers (IEEE) 802.11 standard and implement a protocol based on any amendment to the IEEE 802.11 standard (e.g., 802.11a, 802.11b, 802.11c, 802.11d, 802.11e, etc.). Note that the AP may also include or be coupled to a router and may be connected to another network such as an intranet or the Internet.

The AP can send frames to or receive frames from electronic devices that are associated with the AP. In order to facilitate this, the AP may keep track of the power state of a transceiver in each of the electronic devices associated with the AP. An electronic device may alert the AP of the power save mode of its transceiver using a power management (PM) bit in the header of a frame sent to the AP. An electronic device will set the PM bit to "1" to alert the AP that its transceiver will be in a power save mode, and set the PM bit to "0" to alert the AP that its transceiver will be in a constant awake mode (CAM), which is sometimes also called "continuous alert mode."

For electronic devices that have notified the AP that their transmitters are in a power save mode, the AP transmits a beacon frame every beacon interval to alert the electronic device if the AP has data in its buffer for delivery to the electronic device. The beacon interval typically can be set to be from 100 ms to 2 seconds. Just prior to the transmission of the beacon frame, the electronic device may put its transceiver into a CAM to receive the beacon frame from the AP to determine if the AP has data buffered for it. If the beacon frame indicates that there is no data buffered at the AP for the electronic device, then the electronic device puts its transceiver back into a power save mode. However, if the beacon frame indicates that the AP is buffering data for the electronic device, then the electronic device may retrieve the data using two techniques.

For the first technique, the electronic device puts its transceiver into CAM (if it is not already) and sends a frame to the AP with the PM bit set to "0" to notify the AP that its transceiver is in CAM. The AP will then send all of the data buffered for the electronic device. Note that each data frame sent by the AP to the electronic device contains a bit (a "more data" bit or MD) in the header indicating if there is more data being buffered for the electronic device at the AP. If there is more data being buffered at the AP for the electronic device, then the MD bit is set to "1", while if there is no data left in the AP buffer, the MD bit is set to "0". When the electronic device determines that it has received all of the data buffered for it at the AP (e.g., the MD bit is set to "0"), the electronic device may transmit a frame to the AP notifying it that the electronic device is going to put its transceiver into power save mode. The electronic device then puts its transceiver into power save mode until the next beacon interval.

Note if the electronic device has buffered data for transmission to the AP while in power save mode, the electronic device may transmit this data in data frames to the AP while the transceiver is in CAM (the AP is always in a CAM and will, therefore, receive packets transmitted from the electronic device at any time). In some embodiments, the data buffered by the firmware for transmission by the transceiver to the AP may be categorized based on a priority assigned to the data by the application that generated it. For example, the data may be categorized (i.e., placed) into different queues based on access categories, which, from lowest priority to highest priority, are designated as background, best effort, video and voice. The electronic device may use the access categories to prioritize the data transmitted to the AP while in CAM.

The second technique that may be used by the electronic device to retrieve the data buffered at the AP during the beacon interval proceeds as follows. When the electronic device is alerted by the beacon frame that the AP is buffering data for it, the electronic device may send a frame to the AP to retrieve the buffered data without alerting the AP that the transceiver in the electronic device has transitioned from the power save mode (e.g., the PM bit remains set to "1"). For example, the electronic device may send a power-save poll (PS-Poll) frame to the AP to retrieve buffered data. When the electronic device sends a PS-Poll frame to the AP, the AP sends a buffered data frame to the electronic device, if one is present. If the MD bit in the received frame indicates that the AP is buffering additional data for the electronic device, then the electronic device will continue to send PS-Poll frames to the AP until all of the buffered data frames have been retrieved from the AP. Also, as noted above, the electronic device may transmit any data it is buffering to the AP, and the data sent to the AP may be prioritized based on its access category designation. After the electronic device has transmitted any data to the AP that it desires to transmit, and has received the data buffed for it at the AP, the electronic device may then put its transceiver into a power save mode until the next beacon frame is transmitted by the AP.

In some embodiments, an application operating on an electronic device that is sending or receiving a data stream may use a codec to encode the data stream for transmission or to decode a received data stream for use by the application. For example, a voice over IP application (VOIP) may use a G.711 codec to encode a transmitted data stream and decode a received data stream. The data stream generated by the application is sent to the codec, and the codec encodes the data into packets with a packet spacing determined by the codec. For the G.711 codec the packet spacing is 20 ms. The codec then sends the encoded data to the transceiver driver which sends it to the transceiver firmware for transmission in a data frame over the wireless data link to the AP. The AP then sends the encoded data toward its final destination, which may include forwarding the data through the Internet to a computer system for decoding and use. Typically, the computer system, which may also include an electronic device, will decode the data using a similar codec to that used to encode the data (e.g., a codec application running on the computer system that implements the same encoding and decoding schemes as the codec application running on the electronic device). When data frames containing data encoded using the codec on the computer system are transmitted by the computer system to the electronic device, the path is reversed. The transceiver receives the data frames from the AP, and the data is forwarded by the firmware to the driver, and then on to the codec. The codec decodes the data and sends it to the application.

Note that, while each codec has a characteristic interval for generating data packets that are converted into frames for transmission over the wireless data link, there is also a time period or latency, which if exceeded, may affect the quality of the signal for the user. For example, for the G.711 codec, if the total one-way time delay causes a latency greater than about 150 to 200 ms, then the degradation in the quality of the voice reconstructed using the codec may be noticeable to a user. Thus, if an electronic device tries to save power by entering a power save mode and retrieving data buffered at the AP once every beacon interval (e.g., 100 ms), the increased delay between frames due to waiting for the beacon interval may result in an unacceptable user experience. Furthermore, if the electronic device tries to avoid the delay introduced during the beacon interval by keeping its transceiver in CAM, more energy will be used by the transceiver, which for electronic devices operating on batteries may result in a substantially shorter battery life per charge.

In described embodiments, when an application is first going to send or receive over a wireless data link data frames that are encoded and/or decoded using a codec, the application can determine which codec to use based on a number of factors (e.g., a default codec for the application, the type of information being transmitted, the bandwidth of the wireless data link, etc). Additionally, the application knows or can determine the frame interval for each codec that it may use. The frame interval may be determined by the application to be proportional to the interval at which the codec generates packets from a data stream it is encoding. For example, the application may use a frame interval that is a multiple of the packet generation interval for the codec, equal to or larger than one but less than the amount of time that would cause a noticeable lag in the reconstruction of a data stream by the codec. For example, for a codec with a 20 ms packet generation interval and a delay of 150 ms before lag becomes noticeable, the application may use a frame interval of 20 ms, or 40 ms (or some interval in between).

The application informs the transceiver firmware of the frame interval for the codec that the application has selected. The application may convey this information to the firmware by generating a packet with a control header containing the frame interval of the selected codec. The packet is sent by the application through the operating system to a driver for the transceiver. The driver then forwards the frame interval information to the transceiver firmware. Then, if the transceiver has not already informed the AP that it is in a power save mode and the transceiver is not currently transmitting or receiving frames, the transceiver firmware controls the transceiver so that the transceiver sends a frame to the AP with the PM bit set to "1" and then puts the transceiver in a power save mode. If the transceiver is currently transmitting and/or receiving frames, then the firmware will wait until frames are not being transmitted and/or received, and then the firmware will control the transceiver to send a frame to the AP with the PM bit set to "1" and put the transceiver in a power save mode.

Then, once each frame interval, the firmware may employ one of two alternatives to communicate data frames over the wireless data link with the AP. In the first alternative, the firmware controls the transceiver to send a frame to the AP with the PM bit set to "0" and puts the transceiver into CAM. Note that this frame may be a null data frame, or if the electronic device has buffered data during the frame interval to send to the AP, the firmware may include buffered data in this frame, and may give priority to data generated by the application and encoded using the codec. When the AP receives the frame with the PM bit set to "0", the AP sends any frames buffered at the AP to the transceiver. The transceiver receives this data, which is forwarded by the firmware to the driver then to the application after being decoded by the codec. If the electronic device has generated data that is queued by the firmware, and the data cannot all be sent using the frames notifying the AP of changes in the transceiver power save mode, then the firmware may control the transceiver to send some or all of this queued data while the transceiver is in CAM. For example, if the firmware is employing access category queues (e.g., background, best efforts, video and voice), and the video and/or voice queues contain data generated by the application and encoded by the codec, then the firmware may ensure that these queues are emptied each frame interval by including data from these queues in the power management frames and, if necessary, sending additional data frames to the AP while the transceiver is in CAM.

When there is no more data buffered at the AP (e.g., the MD bit of the last frame received from the AP is "0"), and no more queued data remains that the electronic device wishes to transmit to the AP, the firmware controls the transceiver to send a frame to the AP with the PM bit set to "1" and the firmware puts the transceiver in power save mode. Note that this frame may be a null data frame, or it may include data encoded by the codec if any remains buffered at the electronic device, or other data (e.g., data from the "background" or "best efforts" queues). The firmware may continue controlling the transceiver in this loop every frame interval until the application notifies the firmware (e.g., with another control packet forwarded through the driver) that the application is no longer going to send or receive data encoded using a codec.

Note that the above process may be executed in parallel with any other processes such as the beacon interval process described above. For example, an application may generate data that is encoded using the codec and the same application or other applications on the electronic device may generate data that is not encoded using the codec. All of the data encoded using the codec and buffered by the firmware is transmitted by the electronic device each frame interval, while the other buffered data is transmitted by the electronic device using the beacon interval process (e.g., ordinary data is transmitted at the default 100 ms beacon interval).

In the second alternative for sending data generated by the application and encoded using the codec, the firmware puts the transceiver into an active mode so that it can send and receive frames (e.g., CAM) and controls the transceiver to send a frame to the AP to determine if the AP is buffering data for the electronic device (e.g., a PS-Poll frame). If the AP is buffering data for the electronic device, upon receiving the PS-Poll frame, a single data frame will be transmitted by the AP to the electronic device. If the MD bit of the frame received from the AP is "1", then the firmware will continue to send PS-Poll frames to the AP and receive data frames until the MD bit of the most recently received frame is "0". As with the first alternative above, any data queued by the firmware may be transmitted to the AP each frame interval based on its priority. For example, the firmware may transmit data queued in the video and voice categories each frame interval, but not the data in the background or best efforts categories. This process may also be executed in parallel with any other processes, such as the beacon interval process, described above.

Electronic Device

FIG. 1 presents a block diagram illustrating electronic device 100 in accordance with the described embodiments. Electronic device 100 includes processing subsystem 102, memory subsystem 104, and transceiver 106.

Processing subsystem 102 includes one or more devices configured to perform computational operations. For example, processing subsystem 102 can include one or more microprocessors, application-specific integrated circuits (ASICs), microcontrollers, and/or programmable-logic devices.

Memory subsystem 104 includes one or more devices for storing data and/or instructions for processing subsystem 102 and transceiver 106. For example, memory subsystem 104 can include dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Transceiver 106 is a subsystem that includes radios/antennas, processors, controllers, and/or other devices used for coupling to, communicating on, and handling data and events for communicating on a wireless data link with an AP. For example, transceiver 106 can include a networking system based on the standards described in IEEE 802.11 (and/or complying with one or more of the amendments to the standard, including 802.11a, 802.11b, 802.11c 802.11d, 802.11e, 802.11n, and any other 802.11 amendments and/or protocol), and/or another wireless communication system.

Processing subsystem 102, memory subsystem 104, and transceiver 106 are coupled together using bus 110. Bus 110 is an electrical, optical, or electro-optical connection that the subsystems can use to communicate commands and data among one another. Although only one bus 110 is shown for clarity, different embodiments can include a different number or configuration of electrical, optical, or electro-optical connections between the subsystems.

Although shown as separate subsystems in FIG. 1, in some embodiments, some or all of a given subsystem can be integrated into one or more of the other subsystems in electronic device 100. Although alternative embodiments can be configured in this way, for clarity we describe the subsystems separately.

Electronic device 100 can be (or can be included in) any device with at least one transceiver. For example, electronic device 100 can be (or can be included in) a desktop computer, a laptop computer, a server, a media player, an appliance, a subnotebook/netbook, a tablet computer, a cellular phone, a piece of testing equipment, a network appliance, a set-top box, a personal digital assistant (PDA), a smartphone, a toy, a controller, or another device.

Although we use specific subsystems to describe electronic device 100, in alternative embodiments, different subsystems may be present in electronic device 100. For example, electronic device 100 may include one or more additional processing subsystems 102, memory subsystems 104, and/or transceivers 106. Additionally, one or more of the subsystems may not be present in electronic device 100. Moreover, in some embodiments, electronic device 100 may include one or more additional subsystems that are not shown in FIG. 1. For example, electronic device 100 can include, but is not limited to, a display subsystem for displaying information on a display, a data collection subsystem, an audio and/or video subsystem, an alarm subsystem, a media processing subsystem, and/or an input/output (I/O) subsystem.

Wireless Data Link Environment

Figure 2:
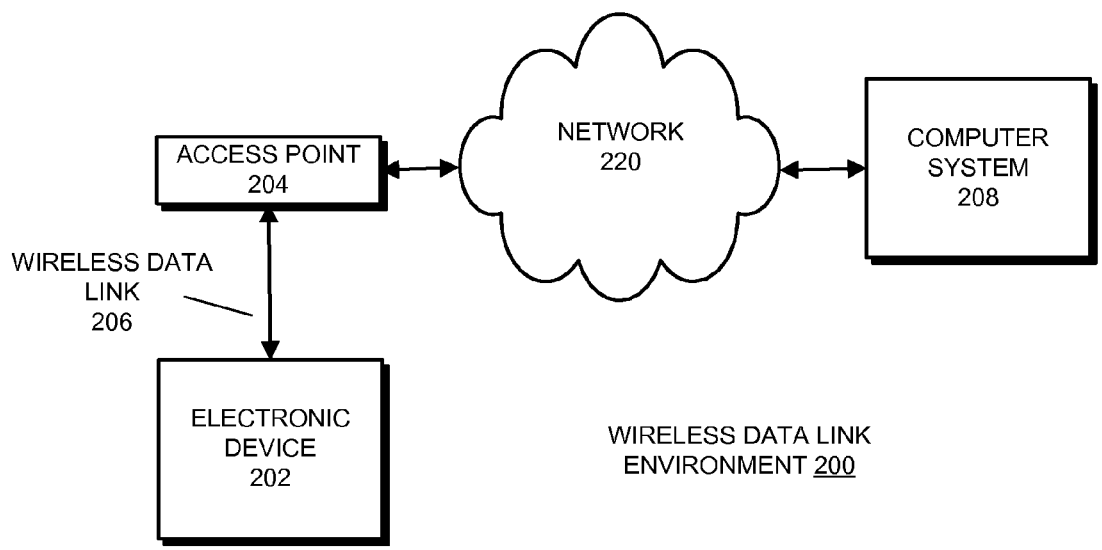
FIG. 2 presents a block diagram illustrating an electronic device coupled through an access point to a computer system across a network in accordance with the described embodiments.

FIG. 2 presents a block diagram illustrating a wireless data link environment 200 in accordance with the described embodiments. As can be seen in FIG. 2, electronic device 202 is coupled to AP 204 via wireless data link 206, and AP 204 and computer system 208 are coupled via network 220. In some embodiments, electronic device 202 includes the subsystems shown in electronic device 100. However, electronic device 202 may comprise different numbers or types of subsystems.

AP 204 is an access point that allows data to be communicated wirelessly with an electronic device and through a wireless data link. Generally, AP 204 can be any type of access point that enables wireless communication of frames (data frames, control frames, etc.) over wireless data link 206 between electronic device 202 and AP 204, and may further allow communication across network 220 with computer system 208 as depicted in FIG. 2. For example, AP 204 can comprise a wireless AP that supports a wireless local area network based on the IEEE 802.11 standards and may further connect to network 220 using wired or wireless means. AP 204 may be or include an electronic device similar to electronic device 100.

Computer system 208 is a computer system that transmits and/or receives data from electronic device 202. Generally, computer system 208 can be any type of computer system and may include an electronic device similar to electronic device 100. Computer system 208 may communicate through network 220 to access point 204 using any number or combination of wired and/or wireless communication links.

Network 220 is an electronic communication network. Generally, network 220 can be any type of network that enables electronic, optical, or electro-optical communication of frames (data frames, control frames, etc.) between an AP and a computer system coupled to the network. For example, network 220 can comprise cellular networks (e.g., 3G/4G networks such as UMTS, LTE, etc.), networks based on the standards described in Institute for Electrical and Electronic Engineers (IEEE) 802.11, Ethernet networks, wired telephone networks, and/or other types or combinations of types of wired and/or wireless networks. In some embodiments, network 220 includes the Internet or is an intranet.

Although we describe the wireless data link environment shown in FIG. 2 as an example, in alternative embodiments, different numbers or types of devices may be present in wireless data link environment 200. For example, in some embodiments, one or more of network 220 and/or computer system 208 are not present. Alternatively, one or more additional computer systems (not shown) and/or electronic devices (not shown) may be coupled to network 220 and/or access point 204.

Operating System

Figure 3:
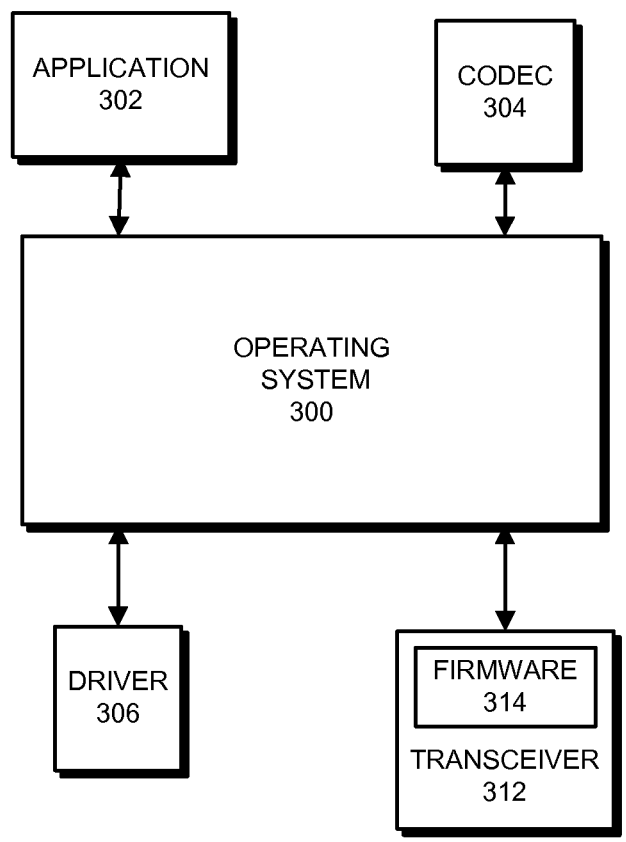
FIG. 3 presents a block diagram illustrating an application, codec, driver, transceiver, and operating system in accordance with the described embodiments.

FIG. 3 presents a block diagram illustrating components of an electronic device in accordance with the described embodiments. In some embodiments, operating system 300 is stored (as program code) in memory subsystem 104 and executed by processing subsystem 102.

Generally, operating system 300 serves as an intermediary between system hardware in electronic device 100 (e.g., subsystems 102-106) and instructions executed by processing subsystem 102, such as application 302, codec 304, and driver 306. For example, operating system 300 can be, but is not limited to being, the OS X operating system from Apple Inc. of Cupertino, Calif.; the FreeBSD operating system from The FreeBSD Foundation of Boulder, Colo.; or another operating system. Operating systems and their general functions are known in the art and hence are not described in detail. Application 302 may be any application that generates and/or receives a data stream using a codec, and may include but is not limited to a voice over IP application, and a music and/or video streaming application.

Operating system 300 provides a low-level abstraction layer for the system hardware in electronic device 100 that application 302 can use to access and/or control the system hardware to perform their functions. Additionally, to manage the transfer of data to and from an application in electronic device 100 using transceiver 106, operating system 300 maintains one or more network protocol stacks (not shown) that each includes a number of logical layers. For example, operating system 300 can maintain an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stacks are known in the art and hence are not described in detail.

Transceiver 312 is controlled by firmware 314 and includes radios/antennas, processors, controllers, and/or other devices used for coupling to, communicating on, and handling data and events for communicating on a wireless data link with an AP. Firmware 314 may be preloaded on transceiver 312 and/or dynamically loaded by driver 306, and generally includes data and/or programming used to control transceiver 312. Firmware 314 data and programming may be stored in transceiver 312 on read-only memory (ROM), programmable read-only memory (PROM), and/or erasable programmable read-only memory (EPROM).

Communicating Frames Over Wireless Link

Figure 4:
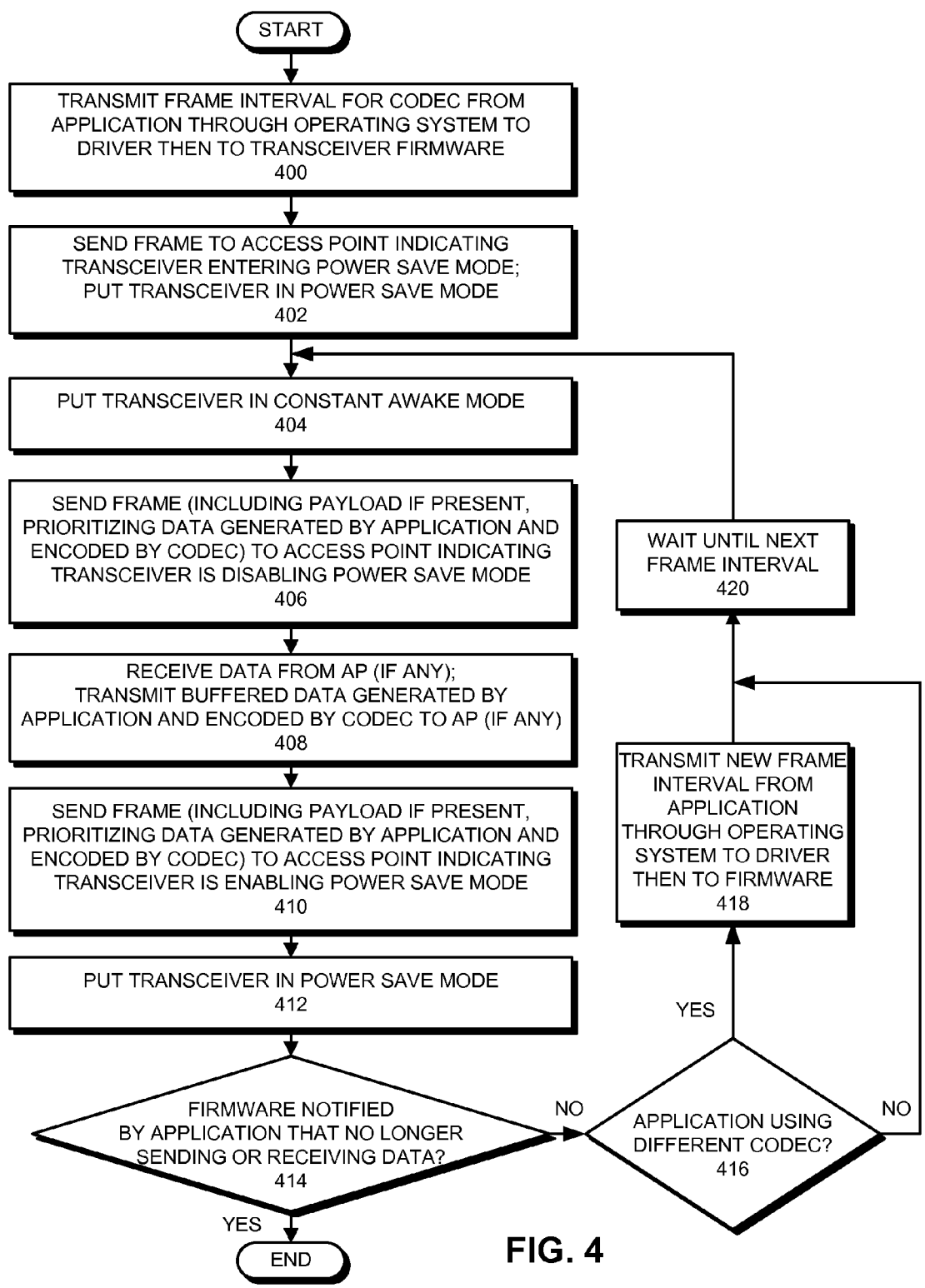
FIG. 4 presents a flowchart illustrating a process for transmitting and/or receiving frames in accordance with the described embodiments.

FIG. 4 presents a flowchart illustrating a process for transmitting frames in accordance with the described embodiments. The operations shown in FIG. 4 are performed by an electronic device such as electronic device 202 (which can include subsystems similar to exemplary electronic device 100). Specifically, operating system 300, codec 304, driver 306 and transceiver 312 (including firmware 314) perform operations for transmitting data generated by an application (e.g., application 302) and/or receiving data for an application, encoding and/or decoding the data, and communicating the data over a wireless data link with an AP such as AP 204.

The process shown in FIG. 4 starts when application 302 uses codec 304 to encode and/or decode data. For example, application 302 may be a voice over IP (VoIP) application launched or otherwise activated by a user of electronic device 202. In step 400, application 302 generates a packet (e.g., a control packet) that contains a header indicating the frame interval that is used by codec 304. Note that application 302 may store a database of the frame intervals, or may determine the frame interval based on the packet generation interval (as discussed above) for each codec that application 302 may use (e.g., codec 304 and other codecs (not shown)). The packet is sent by application 302 to operating system 300 which then transmits the packet to driver 306. Driver 306 then transmits the packet to transceiver 312 where the frame interval information is retrieved from the packet header and stored in firmware 314. Firmware 314 uses the frame interval to control the transition of transceiver 312 between power save mode and CAM, and to send and receive data over the wireless data link as discussed below.

In step 402, firmware 314 controls transceiver 312 to send a frame to AP 204 notifying AP 204 that transceiver 312 is entering a power save mode (e.g., the frame has the PS bit set to "1"). Then, the firmware puts the transceiver in power save mode. AP 204 can then begin buffering data for electronic device 202. Additionally, electronic device 202 begins buffering data it generates for transmission to AP 204. The buffered data may include data generated by application 302 with or without encoding using codec 304, and data generated by any other application on electronic device 202. (Note that the data may be buffered in queues, such as access category queues as described above.) The data may be buffered in memory in firmware 314 or in memory elsewhere in electronic device 202 with pointers in firmware 314 and/or driver 306 that allow access to the queued data through the operating system. For convenience we describe the data as being buffered in and/or by firmware 314.

In step 404, firmware 314 controls transceiver 312 to exit the power save mode and enter a constant awake mode. Then, in step 406 firmware 314 controls transceiver 312 to send a frame with the PS bit set to "0" to AP 204 notifying it that transceiver 312 has exited the power save mode (e.g., entered CAM). If firmware 314 is buffering data generated by application 302 and encoded using codec 304, then firmware 314 may include the data in the frame sent to AP 204. If there is no data from codec 304 buffered in firmware 314, then firmware 314 may include any other buffered data in the frame payload. Note that if firmware 314 queues the buffered data based on its priority (e.g., using access categories), then firmware 314 may select the data to include in frames to AP 204 based on the priority of the data. For example, firmware 314 may transmit only data queued in the video and voice categories.

When AP 204 receives the frame from transceiver 312 with the PS bit set to "0", AP 204 sends the data it has buffered for electronic device 202 to transceiver 312 (step 408). If firmware 314 has more buffered data generated by application 302 and encoded by codec 304, then firmware 314 controls transceiver 312 to transmit the buffered data to AP 204 (step 408). Note that, as discussed above, firmware 314 may also control transceiver 312 to transmit buffered data based on its priority category so that only data in the video and voice categories is transmitted to AP 204 in this step.

When transceiver 312 has received all of the data for electronic device 202 buffered at AP 204 (e.g., the MD bit of the last frame received from AP 204 is "0") and has sent all of the data from its buffer that it desires to send, firmware 314 controls transceiver 312 to send a frame to AP 204 notifying it that transceiver 312 is going to be put in a power save mode (e.g., the PS bit is set to "1") (step 410). If there is data queued by firmware 314 for transmission to AP 204, firmware 314 may include the data in the frame, based on the data priority. Firmware 314 then controls transceiver 312 to enter a power save mode (step 412).

At step 414, if firmware 314 is notified by application 302 that it is no longer going to send or receive data encoded or decoded using a codec, then the process ends (note that other processes for transmitting data, such as the beacon interval process, may still continue). At step 414, if firmware 314 does not receive such a notification, then the process continues to step 416. At step 416, if application 302 notifies firmware 314 that it is using a different codec (e.g., a codec (not depicted in FIG. 3) other than codec 304), then application 302 transmits the frame interval for the new codec through operating system 300 to firmware 314 through driver 306 (step 418).

Application 302 may change the codec it uses to encode or decode data based on a number of factors that are generally well known in the art. For example, application 302 may be receiving streaming video data from computer system 208 (e.g., a server) through network 220 (e.g., the Internet) to AP 204 and through wireless data link 206. When application 302 first starts receiving the data stream from computer system 208, the rate at which frames are received by electronic device 202 (e.g., due to traffic on network 220) may lead application 302 to chose a first codec (e.g., one with a lower data rate). Then, as the data rate on network 220 improves, application 302 may switch to a higher data rate codec with a different frame interval. Then, at step 420, firmware 314 waits until the next frame interval and returns to step 404

Figure 5:
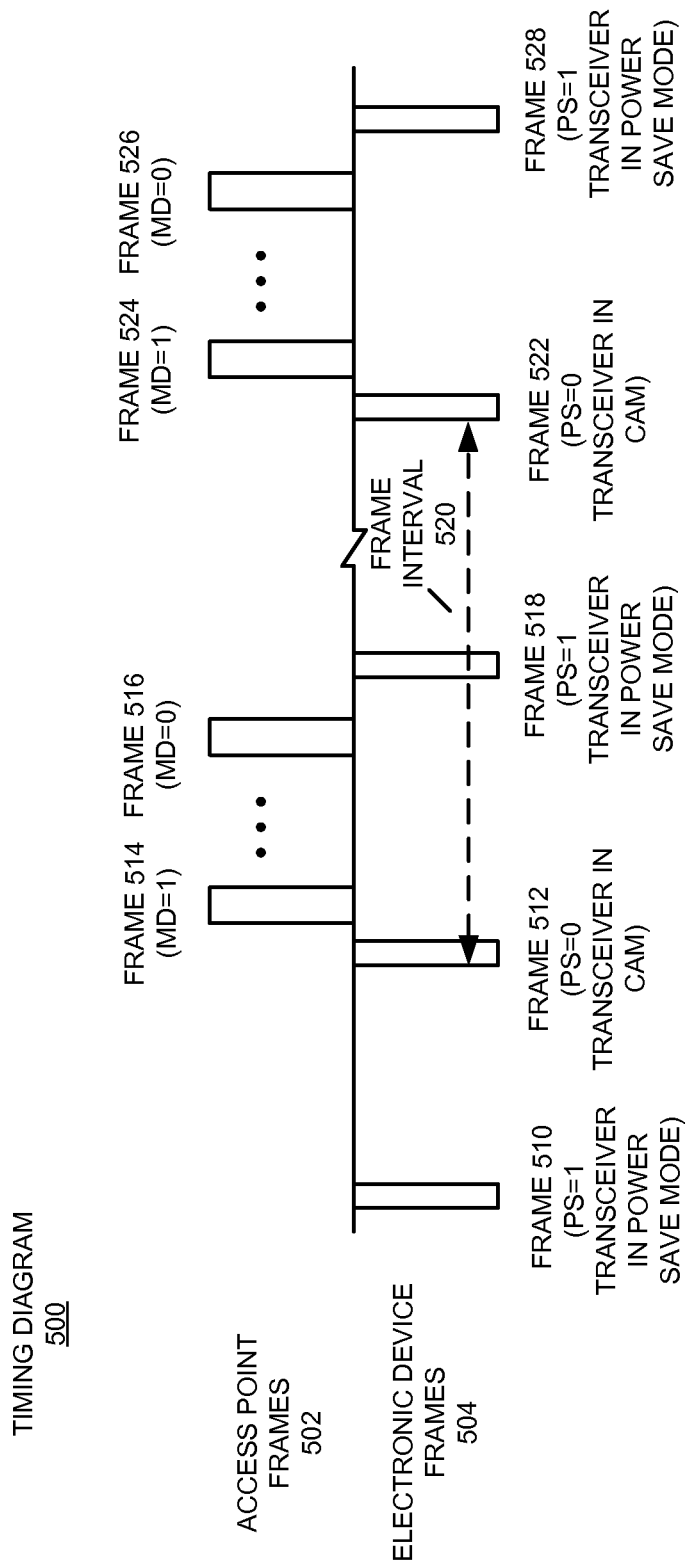
FIG. 5 presents a timing diagram illustrating frames exchanged between the access point and the transceiver in accordance with the described embodiments.

FIG. 5 depicts timing diagram 500 illustrating the timing of frames exchanged between electronic device 202 and AP 204 using the process of FIG. 4 in accordance with the described embodiments. In timing diagram 500, frames sent by AP 204 to electronic device 202 (access point (AP) frames 502) are shown in the top of the diagram, while frames sent by electronic device 202 to AP 204 (electronic device frames 504) are depicted in the bottom of the diagram. (Note that the horizontal axis of timing diagram 500 is not to scale.)

In step 402, electronic device 202 sends frame 510 to AP 204 with its PS bit set to "1" notifying AP 204 that transceiver 312 is entering a power save mode. Then, in step 406, electronic device 202 sends frame 512 notifying AP 204 that transceiver 312 is leaving the power save mode and entering CAM. Frame 512 may also include data queued by firmware 314 as discussed above. When AP 204 receives frame 512, AP 204 sends any data buffered for electronic device 202 at AP 204. FIG. 5 depicts two frames of buffered data, frames 514 and 516 transmitted by AP 204 to electronic device 202. The last frame buffered at AP 204 for electronic device 202 will have its MD bit set to "0" as shown in frame 516. Note that in step 408 if there is any data that is buffered by firmware 314 from application 302 which was encoded using a codec, then firmware 314 will control transceiver 312 to send the data in frames (not shown in FIG. 5) to AP 204. When AP 204 has transmitted all of the data buffered for electronic device 202, (e.g., MD bit="0") then at step 410, electronic device 202 transmits frame 518 to notify AP 204 that transceiver 312 has entered a power save mode. After frame interval 520 has elapsed, the process repeats again with frames 522-528, and continues until firmware 314 is notified that application 302 is no longer sending or receiving data encoded using a codec.

Alternative Embodiments for Communicating Frames Over a Wireless Link

Figure 6:
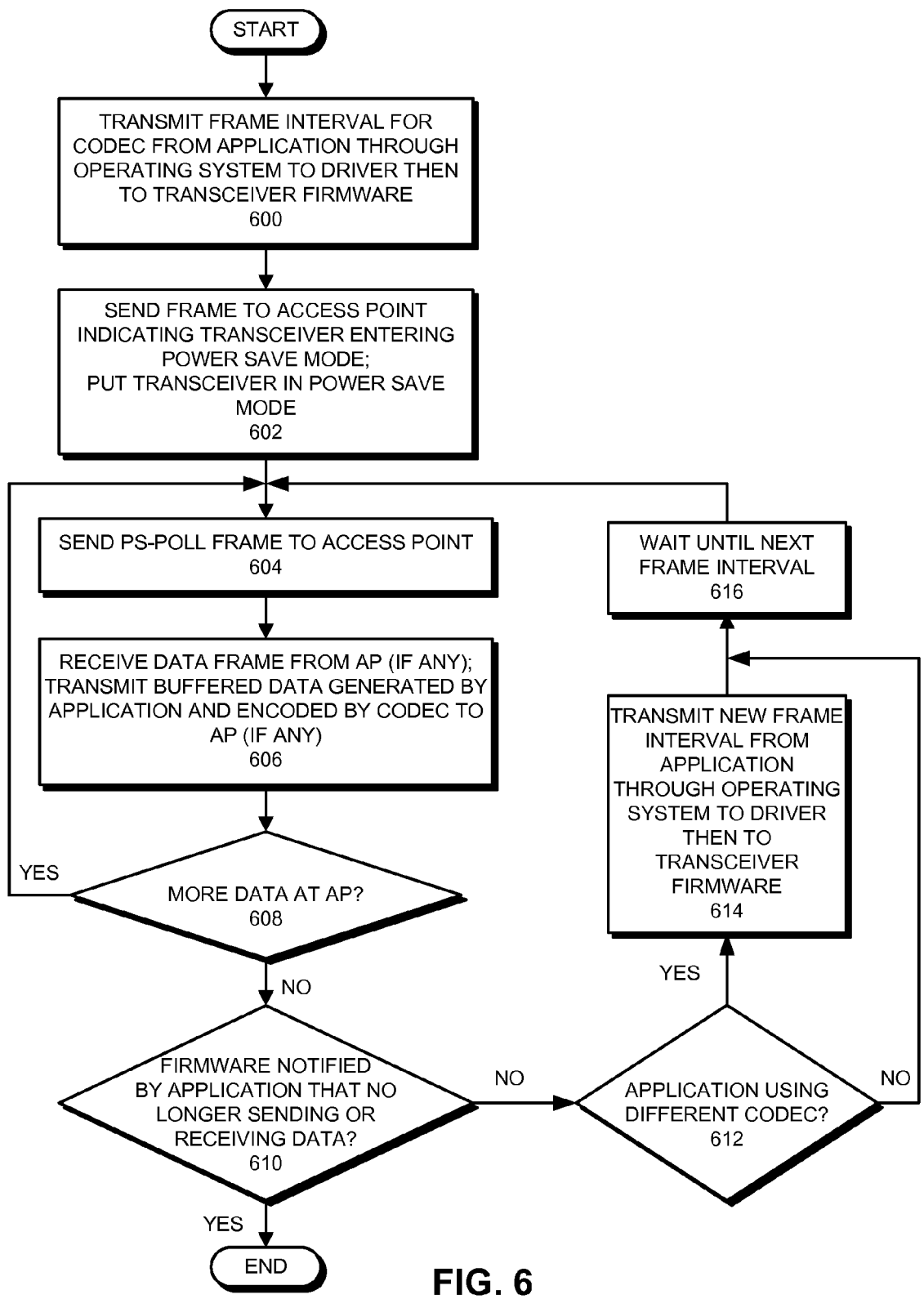
FIG. 6 presents a flowchart illustrating another process for transmitting and/or receiving frames in accordance with the described embodiments.

FIG. 6 presents a flowchart illustrating another process for transmitting frames in accordance with the described embodiments. The operations shown in FIG. 6 are performed by an electronic device such as electronic device 202 (which can include subsystems similar to those in exemplary electronic device 100). Specifically, operating system 300, codec 304, driver 306 and transceiver 312 (including firmware 314) perform operations for transmitting data generated by an application (e.g., application 302) and/or receiving data for an application, encoding and/or decoding the data, and communicating the data over a wireless data link using an AP, such as AP 204.

The process shown in FIG. 6 starts when application 302 begins to use codec 304 to encode and/or decode data. In step 600, application 302 generates a packet (e.g., a control packet) that contains a header indicating the frame interval that is used by codec 304. As noted above, application 302 may store a list or other database of the frame intervals for each codec that application 302 may use. The packet is sent by application 302 to operating system 300 which then transmits the packet to driver 306. Driver 306 then sends the packet to transceiver 312 where the frame interval information is retrieved from the packet header and stored in firmware 314. Firmware 314 uses the frame interval to control transition of transceiver 312 between the power save mode and CAM, and to send and receive data over the wireless data link as discussed below.

In step 602, firmware 314 controls transceiver 312 to send a frame to AP 204 notifying AP 204 that transceiver 312 is entering power save mode (e.g., the frame has the PS bit set to "1"). AP 204 then begins buffering data for electronic device 202. Additionally, electronic device 202 begins buffering data it generates for transmission to AP 204. The buffered data may include data generated by application 302 with or without encoding using codec 304, and data generated by any other application on electronic device 202. The data may be buffered in firmware 314 in queues, such as access category queues as described above.

In step 604, firmware 314 controls transceiver 312 to send a PS-Poll frame to AP 204. When AP 204 receives the PS-Poll frame from transceiver 312, AP 204 sends a buffered frame to transceiver 312 (step 606). If firmware 314 has buffered data generated by application 302 and encoded by codec 304, then firmware 314 controls transceiver 312 to transmit the buffered data to AP 204 (step 606). Note that firmware 314 may also control transceiver 312 to transmit buffered data based on its priority category so that only data in the video and voice categories is transmitted to AP 204 in this step.

At step 608, if AP 204 has more data buffered for electronic device 202 (e.g., the most recently received data frame has an MD bit set to "1"), then the process returns to step 604. If there is no more data buffered at AP 204 for electronic device 202 (e.g., the most recently received data frame from AP 204 has an MD bit set to "0"), then the process continues to step 610.

At step 610, if firmware 314 is notified by application 302 that it is no longer going to send or receive data encoded or decoded using a codec, then the process ends, while if firmware 314 does not receive such a notification, then the process continues to step 612.

At step 612, if application 302 notifies firmware 314 that it is using a different codec (e.g., a codec (not depicted in FIG. 3) other than codec 304), then application 302 transmits the frame interval for the new codec through operating system 300 to firmware 314 through driver 306 (step 614). At step 616, firmware 314 waits until the next frame interval and returns to step 604. Note that in some embodiments steps 604-608 may be interchanged with steps 404-412 of FIG. 4 during one or more loops through the process of FIG. 6. For example, at step 616, the process may proceed to steps 404-412 of FIG. 4; then after executing step 412, the process proceeds to step 610.

Figure 7:
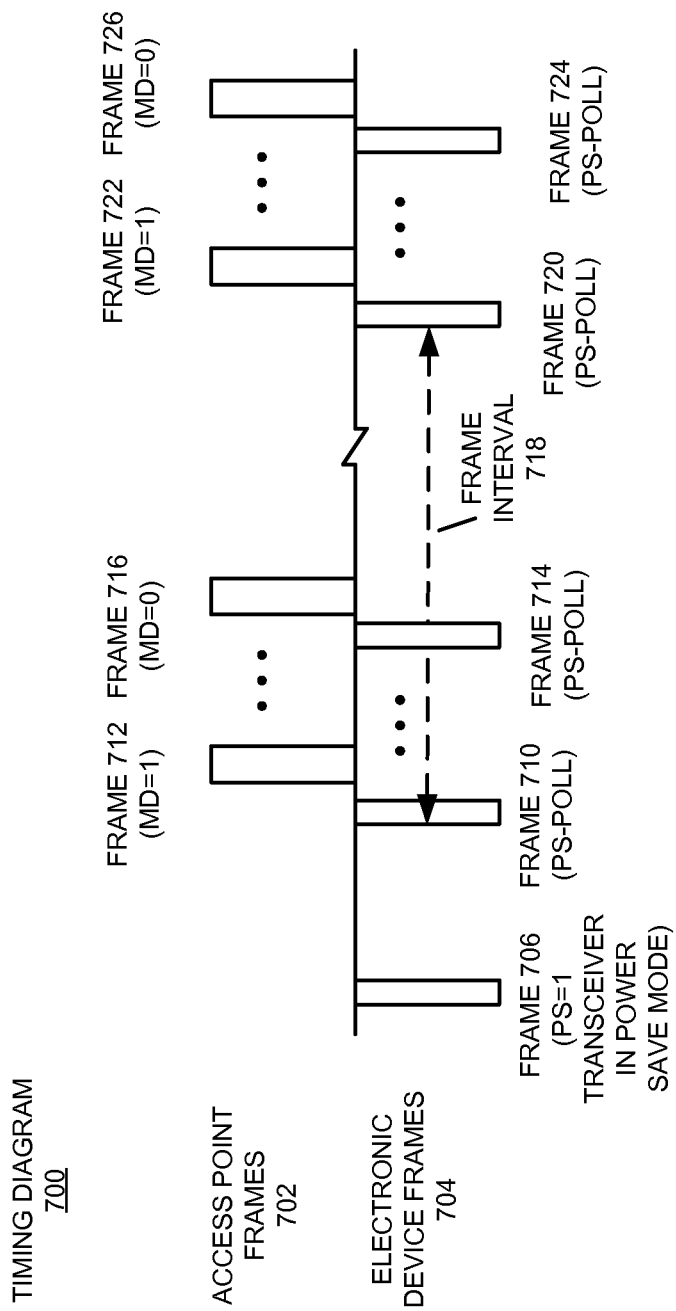
FIG. 7 presents another timing diagram illustrating frames exchanged between the access point and the transceiver in accordance with the described embodiments.

FIG. 7 depicts timing diagram 700 illustrating the timing of frames exchanged between electronic device 202 and AP 204 using the process of FIG. 6 in accordance with the described embodiments. In timing diagram 700, frames sent by AP 204 to electronic device 202 (access point (AP) frames 702) are shown in the top of the diagram, while frames sent by electronic device 202 to AP 204 (electronic device frames 704) are depicted in the bottom of the diagram. (Note that the horizontal axis of timing diagram 700 is not to scale.)

In step 602, electronic device 202 sends frame 706 to AP 204 with its PS bit set to "1" notifying AP 204 that transceiver 312 is entering a power save mode. Then, in step 604, electronic device 202 sends PS-Poll frame 710 to AP 204, and in step 606 AP 204 sends buffered frame 712 to electronic device 202. Electronic device 202 will continue sending PS-Poll frames (step 604) to AP 204 (e.g., PS-Poll frame 714) until there is no more data buffered at AP 204 for electronic device 202 (e.g., the MD bit is "0") at step 608. FIG. 7 depicts two frames of buffered data, frames 712 and 716 transmitted by AP 204 to electronic device 202. Note that at any point during this part of the process, if there is data that is buffered that firmware 314 wants to send to AP 204 (e.g., based on its priority), then firmware 314 will control transceiver 312 to send the data in frames (not shown in FIG. 7) to AP 204 (step 606).

When AP 204 has transmitted all of the data buffered for electronic device 202, (e.g., MD bit="0"), then at step 616, after frame interval 718 has elapsed, the process repeats again with frames 720-726. The process continues until firmware 314 is notified that application 302 is no longer sending or receiving data encoded using a codec.

Alternative Embodiments

Although the subsystems of an electronic device are described as an example, in some embodiments, some or all of the above-described functions are implemented using different mechanisms. For example, in some embodiments, one or more separate integrated circuit chips perform the indicated operations. In these embodiments, the integrated circuit chips can include specialized circuits that implement some or all of the above-described operations, and/or can include general-purpose circuits that execute program code (e.g., firmware, etc.) that causes the circuits to perform the operations. In some embodiments, a combination of integrated circuit chips and processing subsystem 102 is used to implement the system.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for communicating frames over a wireless data link between an access point and a transceiver on an electronic device, comprising:
   in the electronic device, determining a frame interval based on a codec used to encode or decode data contained in the frames, the determining comprising setting the frame interval to a value that is a multiple of a generation interval at which the codec generates packets, wherein the value is less than a reconstruction lag threshold;
   using the frame interval as a timing reference for transitioning the transceiver between a constant awake mode and a power save mode by, during each of one or more frame intervals,
      putting the transceiver into the constant awake mode;
      transmitting a first frame from the transceiver to the access point that indicates that the power save mode is disabled;
      receiving one or more incoming frames from the access point using the transceiver;
      transmitting a second frame from the transceiver to the access point that indicates that the power save mode is enabled; and
      putting the transceiver into the power save mode.

2. The method of claim 1, wherein communicating frames over the wireless data link comprises using an IEEE 802.11 standard, wherein a protocol of the IEEE 802.11 standard is one of: an IEEE 802.11a protocol, an IEEE 802.11b protocol, an IEEE 802.11c protocol, and an IEEE 802.11d protocol.

3. The method of claim 1, wherein determining the frame interval further comprises:
   when a second codec is used to encode or decode data contained in the frames, the frame interval is determined based on the second codec.

4. The method of claim 1, wherein at least one of the first frame or the second frame is a null data frame with a power-save mode bit configured accordingly.

5. The method of claim 1, wherein at least one of the first frame or the second frame includes data.

6. The method of claim 1, further comprising:
   during one or more of the frame intervals,
   transmitting one or more data frames from the transceiver to the access point, wherein the data in the one or more data frames includes only data encoded using the codec.

7. The method of claim 1, further comprising:
   queuing data in the electronic device based on a priority category assigned to the data, wherein the priority category is one of a background category, a best efforts category, a video category, and a voice category; and
   during one or more of the frame intervals,
   transmitting one or more data frames from the transceiver to the access point, wherein the data in the one or more data frames includes only data from the video category and voice category.

8. A method for communicating frames over a wireless data link between an access point and a transceiver on an electronic device, comprising:
   in the electronic device, determining a frame interval based on a codec used to encode or decode data contained in the frames, the determining comprising setting the frame interval to a value that is a multiple of a generation interval at which the codec generates packets, wherein the value is less than a reconstruction lag threshold;
   putting the transceiver into a power save mode;
   using the frame interval as a timing reference for communicating over the wireless data link by, during each of one or more frame intervals,
      transmitting a power-save poll frame from the transceiver to the access point; and
      in response to the power-save poll frame, receiving an incoming frame from the access point using the transceiver.

9. The method of claim 8, further comprising in response to the incoming frame including an indication that the access point is buffering one or more additional frames for the electronic device,
   transmitting an additional power-save poll frame from the transceiver to the access point; and
   in response to the additional power-save poll frame, receiving an additional frame from the access point using the transceiver.

10. The method of claim 8, wherein communicating frames over the wireless data link comprises using an IEEE 802.11 standard, wherein a protocol of the IEEE 802.11 standard is one of: an IEEE 802.11a protocol, an IEEE 802.11b protocol, an IEEE 802.11c protocol, and an IEEE 802.11d protocol.

11. The method of claim 8, wherein determining the frame interval based on the codec further comprises:
   when a second codec is used to encode or decode data contained in the frames, the frame interval is determined based on the second codec.

12. The method of claim 8, further comprising:
   during one or more of the frame intervals,
   transmitting one or more data frames from the transceiver to the access point, wherein the data in the one or more data frames includes only data encoded using the codec.

13. The method of claim 8, further comprising:
   queuing data in the electronic device based on a priority category assigned to the data, wherein the priority category is one of a background category, a best efforts category, a video category, and a voice category; and
   during one or more of the frame intervals,
   transmitting one or more data frames from the transceiver to the access point, wherein the data in the one or more data frames includes only data from the video category and voice category.

14. An apparatus for communicating frames over a wireless data link between an access point and a transceiver in an electronic device, comprising:
the transceiver;
a processing subsystem in the electronic device configured to determine a frame interval based on a codec used to encode or decode data contained in the frames, the determining comprising setting the frame interval to a value that is a multiple of a generation interval at which the codec generates packets, wherein the value is less than a reconstruction lag threshold, wherein the transceiver is configured to use the frame interval as a timing reference for transitioning the transceiver between a constant awake mode and a power save mode so that during each of one or more frame intervals, the transceiver:
transmits a first frame to the access point that indicates that the power save mode is disabled;
enters the constant awake mode;
receives one or more incoming frames from the access point;
transmits a second frame to the access point that indicates that the power save mode is enabled; and
enters the power save mode.

15. The apparatus of claim 14, wherein the transceiver is configured to communicate frames over the wireless data link using an IEEE 802.11 standard, wherein a protocol of the IEEE 802.11 standard is one of: an IEEE 802.11a protocol, an IEEE 802.11b protocol, an IEEE 802.11c protocol, and an IEEE 802.11d protocol.

16. The apparatus of claim 14, wherein the processing subsystem is further configured so that when a second codec is used to encode or decode data contained in the frames, the frame interval is determined based on the second codec.

17. The apparatus of claim 14, wherein the transceiver is further configured so that at least one of the first frame and the second frame is a null data frame.

18. The apparatus of claim 14, wherein the transceiver is further configured so that at least one of the first frame and the second frame includes data.

19. A method for communicating frames over a wireless data link between an access point and a transceiver on an electronic device, comprising:
in the electronic device, determining a frame interval based on a codec used to encode or decode data contained in the frames, the determining comprising setting the frame interval to a value that is a multiple of a generation interval at which the codec generates packets, wherein the value is less than a reconstruction lag threshold;
putting the transceiver into a power save mode;
using the frame interval as a timing reference for communicating over the wireless data link during each of one or more frame intervals, wherein communicating over the wireless data link comprises at least one of a first method and a second method, wherein,
the first method comprises,
transmitting a first frame from the transceiver to the access point that indicates that the power save mode is disabled;
putting the transceiver into the constant awake mode;
receiving one or more incoming frames from the access point using the transceiver;
transmitting a second frame from the transceiver to the access point that indicates that the power save mode is enabled;
putting the transceiver into the power save mode, and the second method comprises,
transmitting a power-save poll frame from the transceiver to the access point; and
in response to the power-save poll frame, receiving an incoming frame from the access point using the transceiver.

20. The method of claim 19, further comprising:
during one or more of the frame intervals,
transmitting one or more data frames from the transceiver to the access point, wherein the data in the one or more data frames includes only data encoded using the codec.

21. The method of claim 19, further comprising:
queuing data in the electronic device based on a priority category assigned to the data, wherein the priority category is one of a background category, a best efforts category, a video category, and a voice category; and
during one or more of the frame intervals,
transmitting one or more data frames from the transceiver to the access point, wherein the data in the one or more data frames includes only data from the video category and voice category.

22. The method of claim 19, wherein determining the frame interval based on the codec further comprises:
when a second codec is used to encode or decode data contained in the frames, the frame interval is determined based on the second codec.

23. A system for communicating frames over a wireless data link between an access point and a transceiver in an electronic device, comprising:
the access point, wherein the access point is configured to keep track of a power save mode of the transceiver, and wherein, when the power save mode is enabled, the access point queues data for the electronic device, and when the power save mode is disabled, the access point transmits outgoing frames including the queued data to the transceiver;
a processing subsystem in the electronic device configured to determine a frame interval based on a codec used to encode or decode data contained in the frames, the determining comprising setting the frame interval to a value that is a multiple of a generation interval at which the codec generates packets, wherein the value is less than a reconstruction lag threshold; and
the transceiver, wherein the transceiver is configured to use the frame interval as a timing reference for communicating over the wireless data link so that during each of one or more frame intervals, the transceiver:
transmits a first frame to the access point that indicates that the power save mode is disabled;
enters the constant awake mode;
receives one or more incoming frames from the access point;
transmits a second frame to the access point that indicates that the power save mode is enabled; and
enters the power save mode.

24. The apparatus of claim 23,
wherein the access point is further configured to transmit an outgoing frame including the queued data to the transceiver in response to receiving a power-save poll frame from the transceiver, and
wherein while the transceiver is in the power save mode, the transceiver is further configured to use the frame interval as a timing reference for communicating over the wireless data link so that during each of one or more frame intervals, the transceiver:
transmits a power-save poll frame to the access point; and in response to the power-save poll frame, receives an incoming frame from the access point.

25. The system of claim 23, wherein the transceiver is configured to communicate frames over the wireless data link using an IEEE 802.11 standard, wherein a protocol of the IEEE 802.11 standard is one of: an IEEE 802.11a protocol, an IEEE 802.11b protocol, an IEEE 802.11c protocol, and an IEEE 802.11d protocol.

26. The system of claim 23, wherein the access point includes a router and is coupled to the Internet.

27. The method of claim 1, wherein the reconstruction lag threshold represents an amount of time between sending two or more outgoing frames for which a lag is noticeable in a receiving device during a reconstruction of data contained in the two or more frames.

* * * * *